US012756865B2

(12) United States Patent
Bae et al.

(10) Patent No.: US 12,756,865 B2
(45) Date of Patent: Oct. 6, 2026

(54) METHOD AND APPARATUS FOR ENCODING MULTI PLANE IMAGE BASED VOLUMETRIC VIDEO

(71) Applicant: Electronics and Telecommunications Research Institute, Daejeon (KR)

(72) Inventors: Seong Jun Bae, Daejeon (KR); Gun Bang, Daejeon (KR); Soo Woong Kim, Daejeon (KR); Ji Hoon Do, Daejeon (KR); Jin Ho Lee, Daejeon (KR); Ha Hyun Lee, Daejeon (KR); Jung Won Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 18/972,732

(22) Filed: Dec. 6, 2024

(65) Prior Publication Data

US 2025/0193443 A1 Jun. 12, 2025

(30) Foreign Application Priority Data

Dec. 7, 2023 (KR) ........................ 10-2023-0177042
Dec. 4, 2024 (KR) ........................ 10-2024-0178550

(51) Int. Cl.
*H04N 19/597* (2014.01)
*H04N 19/543* (2014.01)
*H04N 19/625* (2014.01)

(52) U.S. Cl.
CPC ......... *H04N 19/597* (2014.11); *H04N 19/543* (2014.11); *H04N 19/625* (2014.11)

(58) Field of Classification Search
None
See application file for complete search history.

(56) References Cited

U.S. PATENT DOCUMENTS

| | | | | |
|---|---|---|---|---|
| 10,417,829 | B2 | 9/2019 | Kim et al. | |
| 2019/0251734 | A1* | 8/2019 | Li | H04N 13/161 |
| 2020/0221114 | A1* | 7/2020 | Castaneda | H04N 19/194 |
| 2020/0413094 | A1* | 12/2020 | Lee | H04N 19/167 |
| 2022/0159298 | A1* | 5/2022 | Boyce | H04N 19/597 |
| 2022/0232234 | A1* | 7/2022 | Zakharchenko | G06T 9/001 |
| 2023/0007338 | A1* | 1/2023 | Travert | H04N 21/85406 |

(Continued)

FOREIGN PATENT DOCUMENTS

| | | | | |
|---|---|---|---|---|
| CA | 3221973 | A1 * | 12/2022 | G06T 5/50 |
| EP | 4199516 | A1 * | 6/2023 | H04N 19/597 |

(Continued)

*Primary Examiner* — Jared Walker
(74) *Attorney, Agent, or Firm* — BROADVIEW IP LAW, PC

(57) ABSTRACT

The present disclosure relates to a method and an apparatus for encoding multi plane image (MPI)-based volumetric video. A method for encoding a MPI-based volumetric video according to one aspect of the present disclosure may include: generating an MPI for each frame according to time change from a plurality of multi-viewpoint images; identifying a dynamic region and a static region within the MPI for each frame; generating a first atlas based only on the dynamic region and a second atlas based only on the static region; and encoding the first atlas and the second atlas to generate a bitstream, respectively.

15 Claims, 6 Drawing Sheets

(a) (b)

(56) References Cited

U.S. PATENT DOCUMENTS

| | | | | |
|---|---|---|---|---|
| 2023/0171390 | A1* | 6/2023 | Bae | H04N 19/597 375/240.26 |
| 2023/0186565 | A1 | 6/2023 | Kang et al. | |
| 2023/0188751 | A1* | 6/2023 | Hamza | H04N 19/46 375/240.12 |
| 2023/0224447 | A1* | 7/2023 | Ward | H04N 13/161 348/43 |
| 2023/0379495 | A1* | 11/2023 | Fleureau | H04N 19/597 |
| 2023/0412849 | A1* | 12/2023 | Huang | H04N 19/91 |
| 2024/0267529 | A1* | 8/2024 | Chen | H04N 19/14 |
| 2024/0430480 | A1* | 12/2024 | Lee | H04N 19/597 |

FOREIGN PATENT DOCUMENTS

| | | | |
|---|---|---|---|
| KR | 10-2021-0089068 | A | 7/2021 |
| WO | 2022/214365 | A1 | 10/2022 |

* cited by examiner

METHOD AND APPARATUS FOR ENCODING MULTI PLANE IMAGE BASED VOLUMETRIC VIDEO

CROSS-REFERENCE TO RELATED APPLICATIONS

This application claims the benefit of earlier filing date and right of priority to Korean Application No. 10-2023-0177042, filed on Dec. 7, 2023, No. 10-2024-0178550, filed on Dec. 4, 2024, the contents of which are all hereby incorporated by reference herein in their entirety.

TECHNICAL FIELD

The present disclosure relates to a method and an apparatus for encoding multi plane image (MPI)-based volumetric video.

BACKGROUND

Multi-plane 3D (3D: 3 dimension) data (i.e., multiple plane images (MPI)) is a 3D space representation method that reconstructs 3D space into depth-directed layers and positions pixels in space on each depth-directed plane. Using MPI, 3D space is layered in the depth direction and the texture is reprojected onto the layered planes at a certain interval based on the central camera to represent it as a layered depth image.

The MPI-based space representation method can obtain relatively high image quality when freely rendering space at any point in time, while not requiring high-quality depth information, which is the most important factor in maintaining image quality when expressing spatial information based on real-life, and is therefore being used in various ways as a new 3D real-life space representation method.

SUMMARY

A technical object of the present disclosure is to provide a method and an apparatus for encoding MPI-based volumetric video for distinguishing between dynamic regions with spatial movement and static regions without spatial movement in MPI data and applying different methods during compression to each.

The technical objects to be achieved by the present disclosure are not limited to the above-described technical objects, and other technical objects which are not described herein will be clearly understood by those skilled in the pertinent art from the following description.

A method for encoding a multi-plane image (MPI)-based volumetric video according to one aspect of the present disclosure may include: generating an MPI for each frame according to time change from a plurality of multi-viewpoint images; identifying a dynamic region and a static region within the MPI for each frame; generating a first atlas based only on the dynamic region and a second atlas based only on the static region; and encoding the first atlas and the second atlas to generate a bitstream, respectively.

An apparatus for encoding a multi-plane image (MPI)-based volumetric video according to an additional aspect of the present disclosure may include: at least one processor; and at least one memory operably connected to the at least one processor and storing instructions that, when executed by the one or more processors, cause the apparatus to perform operations. The operations may include: generating an MPI for each frame according to time change from a plurality of multi-viewpoint images; identifying a dynamic region and a static region within the MPI for each frame; generating a first atlas based only on the dynamic region and a second atlas based only on the static region; and encoding the first atlas and the second atlas to generate a bitstream, respectively.

At least one non-transitory computer-readable medium storing at least one instruction according to an additional aspect of the present invention, wherein the at least one instruction executable by at least one processor may control an apparatus for encoding a multi-plane image (MPI)-based volumetric video to: generate an MPI for each frame according to time change from a plurality of multi-viewpoint images; identify a dynamic region and a static region within the MPI for each frame; generate a first atlas based only on the dynamic region and a second atlas based only on the static region; and encode the first atlas and the second atlas to generate a bitstream, respectively.

Preferably, transforms of different policies may be applied to the first atlas and the second atlas, respectively.

Preferably, the transforms may include a discrete cosine transform (DCT).

Preferably, in generating the first atlas, a single first geometry atlas that does not change over time may be generated for the dynamic region, and a first texture atlas may be generated for each frame using the first geometry atlas.

Preferably, the first texture atlas may be reconstructed into a viewpoint plane, a transform may be applied to color values that change according to viewpoint directions for each viewpoint plane unit to derive transform coefficients, the transform coefficients may be reconstructed into a spatial plane to derive a plurality of coefficient planes, and only one or more coefficient planes selected from the plurality of coefficient planes may be encoded to generate the bitstream.

Preferably, in generating the second atlas, a single second geometry atlas may be generated for the static region, and a single second texture atlas that does not change over time may be generated using the second geometry atlas.

Preferably, the second texture atlas may be reconstructed into a viewpoint plane, a transform may be applied to color values that change according to viewpoint directions for each viewpoint plane unit to derive transform coefficients, the transform coefficients may be reconstructed into a spatial plane to derive a coefficient plane, and the coefficient plane may be encoded to generate the bitstream.

According to an embodiment of the present invention, when compressing a volumetric video using an MPI geometric representation structure, a higher compression ratio can be achieved while expressing color changes according to movement of a viewpoint.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
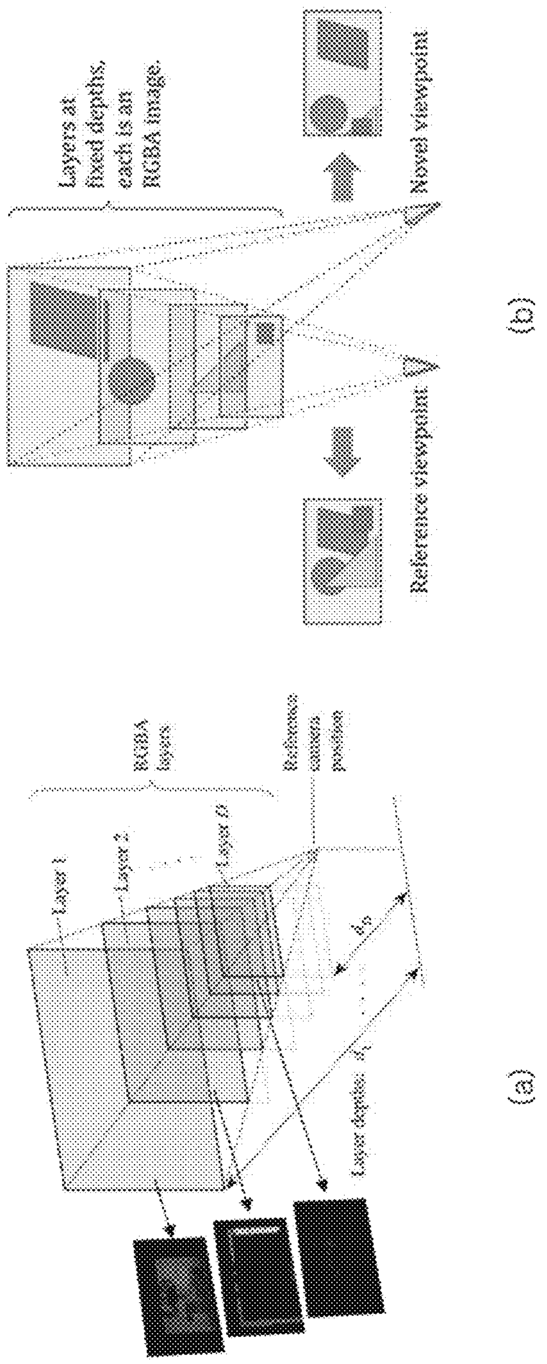
FIG. 1 is a drawing for explaining a spatial expression method based on a multi-plane image (MPI).

Since the present disclosure can make various changes and have various embodiments, specific embodiments will be illustrated in the drawings and described in detail in the detailed description. However, this is not intended to limit the present disclosure to specific embodiments, and should be understood to include all changes, equivalents, and substitutes included in the feature and technical scope of the present disclosure. Similar reference numbers in the drawings refer to identical or similar functions across various aspects. The shapes and sizes of elements in the drawings may be exaggerated for clearer explanation. For a detailed description of the exemplary embodiments described below, refer to the accompanying drawings, which illustrate specific embodiments by way of example. These embodiments are described in sufficient detail to enable those skilled in the art to practice the embodiments. It should be understood that the various embodiments are different from one another but are not necessarily mutually exclusive. For example, specific shapes, structures and characteristics described herein with respect to one embodiment may be implemented in other embodiments without departing from the spirit and scope of the disclosure. Additionally, it should be understood that the position or arrangement of individual components within each disclosed embodiment may be changed without departing from the spirit and scope of the embodiment. Accordingly, the detailed description that follows is not to be intended in a limiting sense, and the scope of the exemplary embodiments is limited only by the appended claims, together with all equivalents to what those claims assert if properly described.

In the present disclosure, terms such as first, second, etc. may be used to describe various components, but the components should not be limited by the terms. The above terms are used only for the purpose of distinguishing one component from another. For example, a first component may be referred to as a second component, and similarly, the second component may be referred to as a first component without departing from the scope of the present disclosure. The term "and/or" includes any of a plurality of related stated items or a combination of a plurality of related stated items.

When a component of the present disclosure is referred to as being "connected" or "accessed" to another component, it may be directly connected or connected to the other component, but other components may exist in between. It must be understood that it may be possible. On the other hand, when it is mentioned that a component is "directly connected" or "directly accessed" to another component, it should be understood that there are no other components in between.

The components appearing in the embodiments of the present disclosure are shown independently to represent different characteristic functions, and do not mean that each component is comprised of separate hardware or one software component. That is, each component is listed and included as a separate component for convenience of explanation, and at least two of each component can be combined to form one component, or one component can be divided into a plurality of components to perform a function, and each of these components can be divided into a plurality of components. Integrated embodiments and separate embodiments of the constituent parts are also included in the scope of the present disclosure as long as they do not deviate from the essence of the present disclosure.

The terms used in this disclosure are only used to describe specific embodiments and are not intended to limit the disclosure. Singular expressions include plural expressions unless the context clearly dictates otherwise. In the present disclosure, terms such as "comprise" or "have" are intended to designate the presence of features, numbers, steps, operations, components, parts, or combinations thereof described in the specification, but are not intended to indicate the presence of one or more other features. It should be understood that this does not exclude in advance the possibility of the existence or addition of elements, numbers, steps, operations, components, parts, or combinations thereof. In other words, the description of "including" a specific configuration in this disclosure does not exclude configurations other than the configuration, and means that additional configurations may be included in the scope of the implementation of the disclosure or the technical feature of the disclosure.

Some of the components of the present disclosure may not be essential components that perform essential functions in the present disclosure, but may simply be optional components to improve performance. The present disclosure can be implemented by including only essential components for implementing the essence of the present disclosure, excluding components used only to improve performance, and a structure that includes only essential components excluding optional components used only to improve performance is also included in the scope of rights of this disclosure.

Hereinafter, embodiments of the present disclosure will be described in detail with reference to the drawings. In describing the embodiments of the present specification, if it is determined that a detailed description of a related known configuration or function may obscure the gist of the present specification, the detailed description will be omitted, and the same reference numerals will be used for the same components in the drawings. Redundant descriptions of the same components are omitted.

FIG. 1 is a drawing for explaining a spatial expression method based on a multi-plane image (MPI).

As shown in FIG. 1(*a*), a multi-plane image (MPI) is a method of representing a 3D space by reconstructing a three-dimensional (3D) space into depth-direction planes/layers (i.e., layer 1, . . . , D) and positioning pixels in the space on each depth-direction plane/layer. In other words, it is a method of efficiently representing a scene in a 3D space by decomposing it into multiple plane images. D represents the number of planes/layers, and an MPI represents a set of D RGBA layers (i.e., RGB color images and alpha/transparency).

An MPI can express a certain level of motion parallax with less data by restricting points to exist only in units of planes (layers), compared to the existing point cloud or voxel method where each point is free to float at any arbitrary location in space. As shown in FIG. 1(*b*), an MPI can freely render a novel viewpoint from any camera position, so motion parallax can be implemented by moving in units of planes/layers.

In addition, it has the advantage that there are various methods for generating an MPI without depth information, such as using machine learning.

Figure 2:
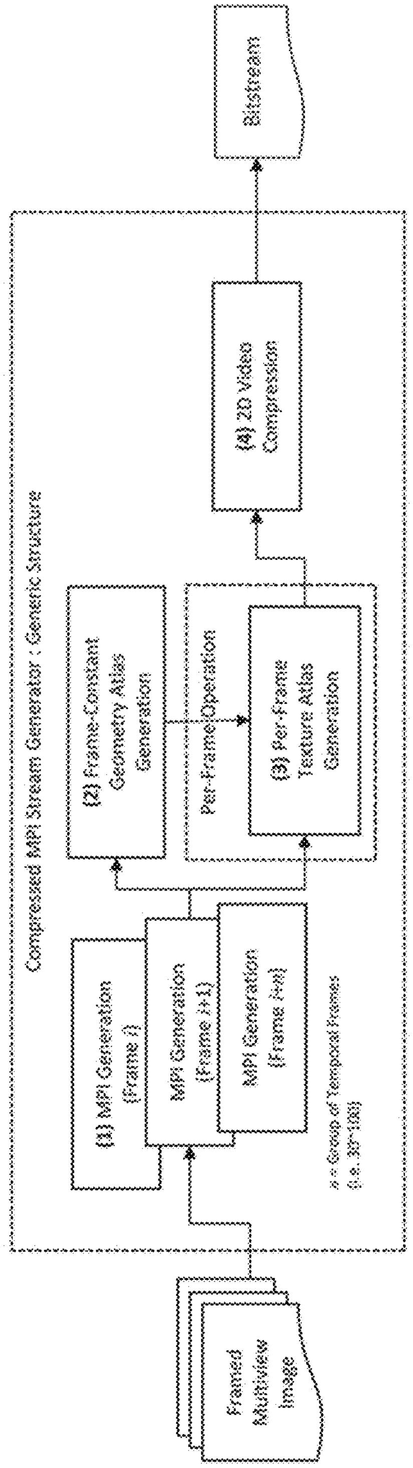
FIG. 2 is a drawing for explaining a method for compressing a 3D volumetric video expressed in an MPI format.
Figure 3:
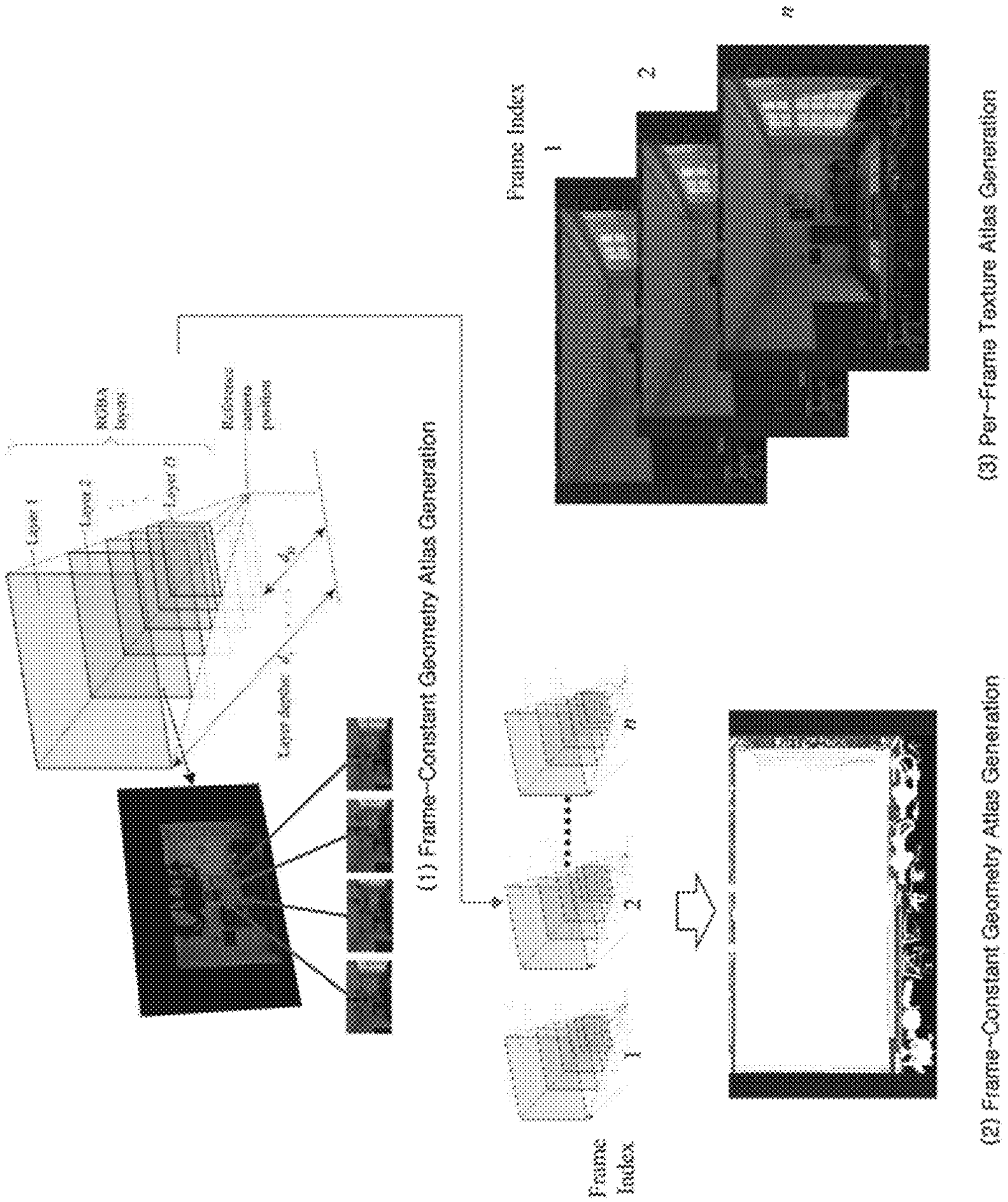
FIG. 3 is a drawing for explaining a method for compressing a 3D volumetric video expressed in an MPI format.

FIGS. 2 and 3 are drawings for explaining a method for compressing a 3D volumetric video expressed in an MPI format.

Step (1): The compressed MPI stream generator generates MPIs from framed multi-view images. Here, the framed multi-view is the original multi-view image for MPI generation, which means a set of images acquired from various view positions using a camera array, etc. In other words, it can mean images that are structured in a specific way from a multi-view image or processed from a limited viewpoint.

The compressed MPI stream generation device generates an MPI based on M×N images captured by a camera array. Here, n represents a temporal frame group and can be, for example, 30 to 100. The compressed MPI stream generation device can render and generate an image at an arbitrary camera position through the MPI generated in this manner, which corresponds to basic data.

Step (2): The compressed MPI stream generator generates a frame-constant geometry atlas.

This is the step of reconstructing the pixel information of MPI existing in multiple layers into a single atlas. The compressed MPI stream generator accommodates all the pixel position information of MPI that changes across multiple frames over time into a single atlas, and generates a single atlas that can be applied singly to a frame unit of a certain time interval (e.g., a GOP (Group of Pictures) in general or n (i.e., a temporal frame group) in FIGS. 2 and 3).

Step (3): The compressed MPI stream generation device generates a texture atlas for each frame.

That is, the compressed MPI stream generation device generates a texture atlas for each frame by mapping the MPI color information for each frame over time to the pixel location of the atlas generated in step (2).

Step (4): The compressed MPI stream generation device performs 2D video compression.

The 2D atlas generated in units of time frames is arranged along the time axis to form a 2D video, and it is compressed to a standard for existing 2D video compression (e.g., H.264/HEVC, etc.) to output a bitstream.

Meanwhile, color values at the same location change while being simultaneously affected by changes in time and viewing direction. However, the MPI-based volumetric video compression method described above only considers changes in time and has a problem in that it does not properly preserve "view-dependent color variation," which is a change in viewing direction.

Specifically, in step (1) of FIG. 3, a point in volumetric space actually has different color values depending on the viewing angle, but the existing MPI generation structure has a structure that can preserve only one by averaging the color value change according to the angle or using only the representative value. Therefore, through steps (2) and (3) of FIG. 3, finally, only one texture atlas composed of only the average value (or representative value) is generated for a single time frame. In this way, since only one texture of the average value is compressed for the time axis, only the color/geometric change values for time are ultimately preserved, and the color values according to the viewing direction are not preserved. Therefore, there is a limitation that a reproduction result that is inferior to the original can be obtained when reproducing after decoding.

In addition, there is a problem that, despite having spatial information directly, in steps (2) and (3) of FIG. 3, the moving and non-moving areas in volumetric space are processed without distinction, which is inefficient from the perspective of video information compression.

More specifically, the present invention proposes a compression system capable of achieving a higher compression ratio than the existing method while expressing color changes according to the movement of the viewpoint, by additionally applying the following steps to the existing MPI-based volumetric video compression step: i) a step of detecting a dynamic region, ii) a step of independently and separately generating the atlas of a geometric region for the dynamic region and a geometric region for the static region in MPI, iii) a step of generating a common atlas that can accommodate all geometric information in MPI that changes over time for the dynamic region and generating only one atlas for the static region, iv) a step of performing a DCT transform on the viewpoint plane for each generated atlas, which changes in the viewpoint direction of the input image, and v) a step of deriving an optimal compression ratio by applying different policies to the dynamic region atlas and the static region atlas from the viewpoint of rate-distortion optimization of the transformed DCT coefficients.

Figure 4:
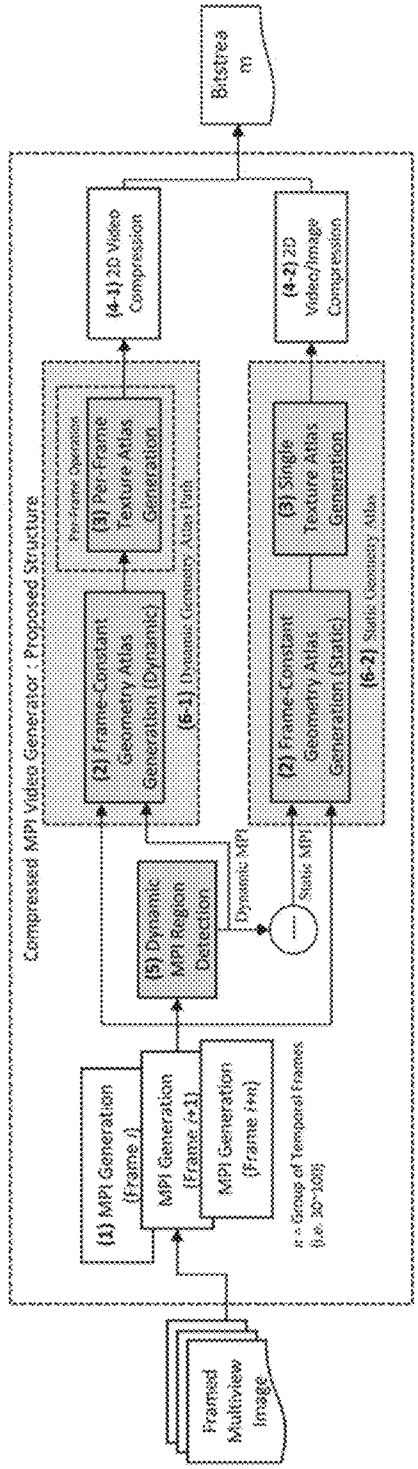
FIG. 4 illustrates an MPI-based volumetric video compression method according to an embodiment of the present invention.

FIG. 4 illustrates an MPI-based volumetric video compression method according to an embodiment of the present invention.

The MPI-based volumetric video compression method according to FIG. 4 may further include steps (5), (6-1) and (6-2) compared to FIG. 2, and steps (2) to (4) of FIG. 2 may be divided into a part corresponding to step (6-1) and a part corresponding to step (6-2) in FIG. 4.

Step (5): The compressed MPI video generator finds/detects a dynamic region in the MPI based on the MPI of the input time frame.

The compressed MPI video generator generates an atlas by distinguishing between dynamic regions and static regions within the MPI. Step (6-1) (Dynamic Geometry Atlas Path) is performed for the dynamic region, and Step (6-2) (Static Geometry Atlas) is performed for the static region.

Step (6-1) includes steps (2) and (3). In step (2) of step (6-1), the compressed MPI video generation device generates a single atlas that does not change as frames progress. Then, in step (3) of step (6-1), the compressed MPI video generation device generates an atlas for each time frame using the single atlas, and then performs a discrete cosine transform (DCT) on the view plane to preserve color value changes according to viewpoint movement. Thereafter, in step (4-1), the compressed MPI video generation device compresses the DCT coefficient atlas image (multi-frames listed along the time axis) using a 2D video compression coding method.

Step (6-2): The compressed MPI video generator generates an atlas using only geometric information in the MPI separated into a static region.

Step (6-2) also includes steps (2) and (3). In step (2) of step (6-2), the compressed MPI video generator generates an atlas using a single geometric information that does not change even when the frame progresses. In step (3) of step (6-2), the compressed MPI video generator generates a single atlas along the time axis using a single atlas, and then performs DCT on the view plane to preserve color value changes due to viewpoint movement. Thereafter, in step (4-2), the Compressed MPI Video Generator compresses the generated DCT coefficient atlas image using a still image compression encoding method.

As described above, the compressed MPI video generation device according to one embodiment of the present invention independently generates an atlas by distinguishing a dynamic region and a static region in step (3). That is, by using the MPI dynamic region and static region information distinguished in step (5), an atlas for the dynamic region (i.e., step (3) in step (6-1)) and an atlas for the static region (i.e., step (3) in step (6-2)) are individually generated.

Here, the compressed MPI video generation device applies DCT on the view plane to preserve the color value that changes according to the viewpoint movement, and then compresses the DCT coefficient plane information using a 2D video compression standard. This will be described in more detail with reference to the drawings below.

In this way, according to one embodiment of the present invention, by applying different policies of DCT transform to the dynamic region and the static region, a higher compression efficiency can be obtained.

For example, more DCT transform coefficients can be preserved for the dynamic region, and only one direct current (DC) plane can be compressed and transmitted for the static region.

As another example, the dynamic region can perform 2D inter-frame prediction compression encoding for the time frame to remove data redundancy between frames, and the static region can use only one frame having only the average color value of the entire frame (i.e., performing still image compression encoding).

Figure 5:
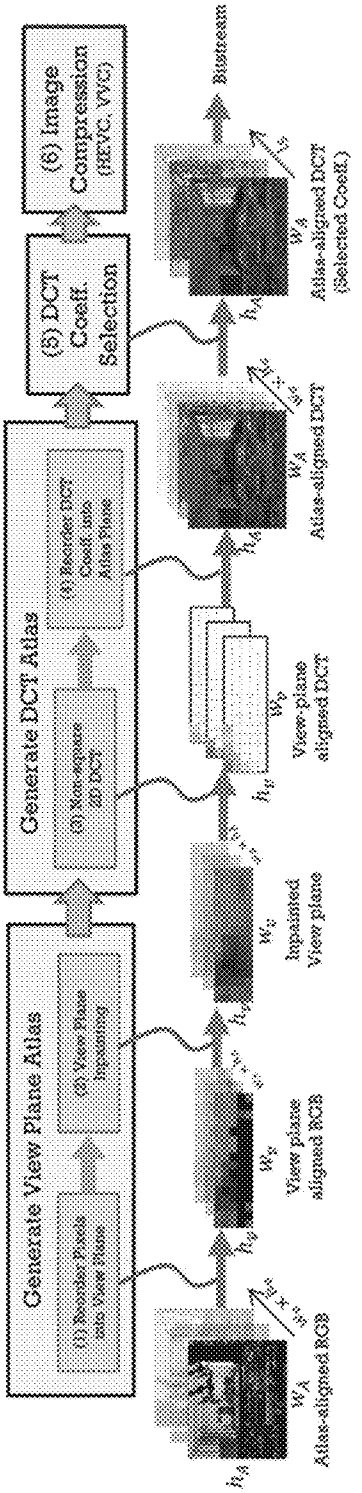
FIG. 5 illustrates a method for independently generating an atlas by distinguishing a dynamic region and a static region according to an embodiment of the present invention.

FIG. 5 illustrates a method for independently generating an atlas by distinguishing a dynamic region and a static region according to an embodiment of the present invention.

Referring to FIG. 5, the process of obtaining DCT in the view plane is as follows:

Step (1): The compressed MPI video generation device reorders the multi-view MPI atlas stored in the atlas space plane (x, $y=h_A \times w_A \times N_v$) into the view plane ($w_v \times h_v$).

Step (2): The compressed MPI video generation device performs view plane inpainting (interpolation) to fill in the empty pixels of areas that are not captured by the camera or covered by the front object according to the original view position on the view plane by inpainting the neighboring pixels.

Step (3): The compressed MPI video generation device performs a 2D DCT of size $w_v \times h_v$ for each view plane unit that is interpolated.

Step (4): The compressed MPI video generator reorders the transformed DCT coefficients back into the form of an atlas space plane ($w_A \times h_A$).

Step (5): The compressed MPI video generator selects coefficient planes that are rate-distortion optimal (i.e., have the best image distortion efficiency relative to the amount of data used) among the DCT coefficient atlas images that exist as many as $w_v \times h_v$.

Step (6): The compressed MPI video generation device compresses the selected coefficient planes using a 2D video standard to generate the final bitstream.

Figure 6:
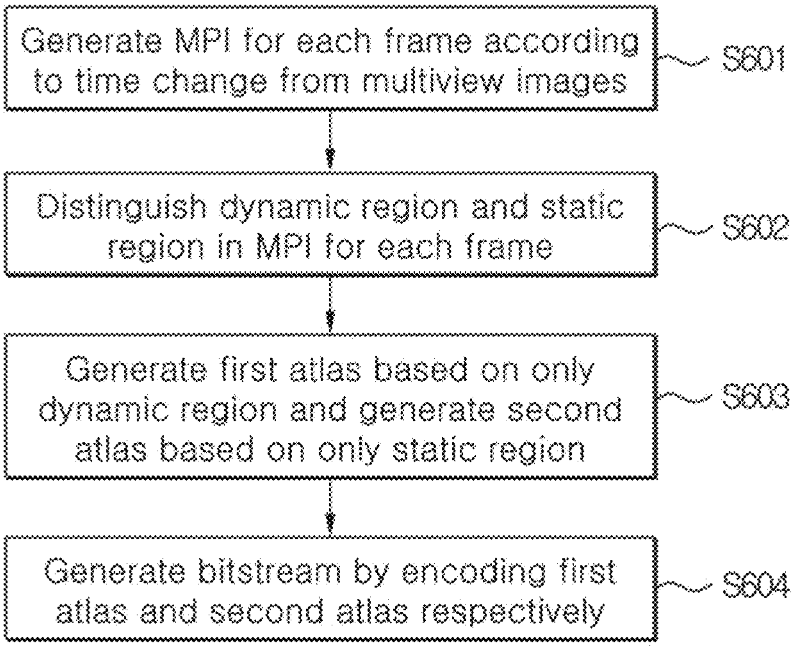
FIG. 6 illustrates a method for encoding an MPI-based volumetric video according to an embodiment of the present invention.

FIG. 6 illustrates a method for encoding an MPI-based volumetric video according to an embodiment of the present invention.

Referring to FIG. 6, the encoding device generates an MPI for each frame according to time change from multiple multi-viewpoint images (S601).

Here, the encoding device generates multiple MPIs from multiple multi-viewpoint images and generates an MPI for each frame according to time change.

The encoding device identifies between a dynamic area and a static area within each frame MPI (S602).

Here, the encoding device can detect dynamic region(s) within each MPI and determine the other region as static region(s).

The encoding device generates a first atlas based only on the dynamic region and a second atlas based only on the static region (S603).

Then, the encoding device encodes the first atlas and the second atlas respectively to generate a bitstream (S604).

Here, different transformation policies can be applied to the first atlas and the second atlas, respectively. For example, more DCT transform coefficients can be preserved for the dynamic region, and a bitstream can be generated for only one DC (direct current) plane for the static region. As another example, 2D inter-frame prediction compression encoding can be performed for the time frames for the dynamic region to remove inter-frame data redundancy, and a bitstream can be generated for the static region with only one frame having only the average color value of the entire frame.

Here, the transform may include a discrete cosine transform (DCT).

Specifically, in generating the first atlas, a single first geometry atlas that does not change over time for the dynamic region is generated, and a first texture atlas for each frame may be generated using the first geometry atlas.

Here, the first texture atlas is reconstructed (reordered) into a viewpoint plane, and transform is applied to color values that vary depending on viewpoint directions for each viewpoint plane unit to derive transform coefficients, and the transform coefficients are reconstructed (reordered) into a spatial plane to derive a plurality of coefficient planes, and only one or more coefficient planes selected from the plurality of coefficient planes can be encoded to generate the bitstream.

In addition, in generating the second atlas, a single second geometry atlas can be generated for the static region, and a single second texture atlas that does not change over time can be generated using the second geometry atlas.

Here, the second texture atlas is reconstructed (reordered) into a viewpoint plane, and transform coefficients are derived by applying transform to color values that vary depending on viewpoint directions for each viewpoint plane unit, and the transform coefficients are reconstructed (reordered) into a spatial plane to derive a coefficient plane, and the coefficient plane can be encoded to generate the bitstream.

Figure 7:
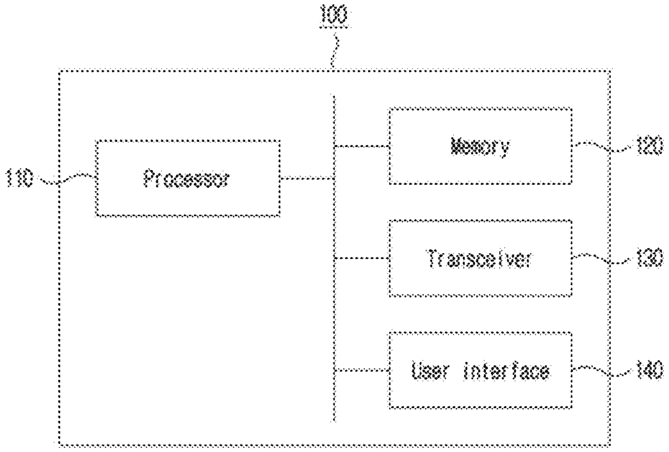
FIG. 7 is a block diagram of a device for encoding an MPI-based volumetric video according to an embodiment of the present invention.

FIG. 7 is a block diagram of a device for encoding an MPI-based volumetric video according to an embodiment of the present invention.

The apparatus for encoding MPI-based volumetric video 100 may include one or more processors 110, one or more memories 120, one or more transceivers 130, and one or more user interfaces 140. The memory 120 may be included in the processor 110 or may be configured separately. The memory 120 may store instructions that, when executed by the processor 110, cause the apparatus 100 to perform an operation. The transceiver 130 may transmit and/or receive signals and data that the apparatus 100 exchanges with other entities. The user interface 140 may receive a user's input regarding the apparatus 100 or provide an output of the apparatus 100 to the user. Among the components of the apparatus 100, components other than the processor 110 and the memory 120 may not be included in some cases, and other components not shown in FIG. 7 may be included in the apparatus 100.

The processor 110 may be configured to enable the above-described first apparatus 100 to perform methods according to various examples of the present disclosure. Although not shown in FIG. 7, the processor 110 may be configured as a set of modules that perform each method/function proposed in this disclosure. Modules may be configured in hardware and/or software form.

The processor 110 generates an MPI for each frame according to time change from multiple multi-viewpoint images.

Here, the processor 110 generates multiple MPIs from multiple multi-viewpoint images and generates an MPI for each frame according to time change.

The processor 110 identifies between a dynamic area and a static area within each frame MPI.

Here, the processor 110 can detect dynamic region(s) within each MPI and determine the other region as static region(s).

The processor 110 generates a first atlas based only on the dynamic region and a second atlas based only on the static region.

Then, the processor 110 encodes the first atlas and the second atlas respectively to generate a bitstream.

Here, different transformation policies can be applied to the first atlas and the second atlas, respectively. For example, more DCT transform coefficients can be preserved for the dynamic region, and a bitstream can be generated for only one DC (direct current) plane for the static region. As another example, 2D inter-frame prediction compression encoding can be performed for the time frames for the dynamic region to remove inter-frame data redundancy, and a bitstream can be generated for the static region with only one frame having only the average color value of the entire frame.

Here, the transform may include a discrete cosine transform (DCT).

Specifically, in generating the first atlas, a single first geometry atlas that does not change over time for the dynamic region is generated, and a first texture atlas for each frame may be generated using the first geometry atlas.

Here, the first texture atlas is reconstructed (reordered) into a viewpoint plane, and transform is applied to color values that vary depending on viewpoint directions for each viewpoint plane unit to derive transform coefficients, and the transform coefficients are reconstructed (reordered) into a spatial plane to derive a plurality of coefficient planes, and only one or more coefficient planes selected from the plurality of coefficient planes can be encoded to generate the bitstream.

In addition, in generating the second atlas, a single second geometry atlas can be generated for the static region, and a single second texture atlas that does not change over time can be generated using the second geometry atlas.

Here, the second texture atlas is reconstructed (reordered) into a viewpoint plane, and transform coefficients are derived by applying transform to color values that vary depending on viewpoint directions for each viewpoint plane unit, and the transform coefficients are reconstructed (reordered) into a spatial plane to derive a coefficient plane, and the coefficient plane can be encoded to generate the bitstream.

Components described in exemplary embodiments of the present disclosure may be implemented by hardware elements. For example, the hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in exemplary embodiments may be implemented in a combination of hardware and software.

The method according to an embodiment of the present disclosure may be implemented as a program that can be executed by a computer, and the computer program may be recorded in various recording media such as magnetic storage media, optical read media, and digital storage media.

The various technologies described in this disclosure may be implemented as digital electronic circuits or computer hardware, firmware, software, or a combination thereof. The above technologies may be implemented as a computer program product, that is, a computer program tangibly embodied in an information medium (e.g., a machine-readable storage device (e.g., a computer-readable medium) or a data processing device) or a computer program implemented as signals processed by or propagated by a data processing device to cause the operation of the data processing device (e.g., programmable processor, computer, or multiple computers).

Computer program(s) may be written in any form of programming language, including compiled or interpreted languages and may be distributed as a stand-alone program or in any form, including modules, components, subroutines, or other units suitable for use in a computing environment. A computer program may be executed by a single computer or by multiple computers distributed at one site or multiple sites and interconnected by a communications network.

Examples of processors suitable for executing computer programs include general-purpose and special-purpose microprocessors, and one or more processors in digital computers. Typically, a processor receives instructions and data from read-only memory, random access memory, or both. Components of a computer may include at least one processor for executing instructions and one or more memory devices for storing instructions and data. Additionally, the computer may include one or more mass storage devices for data storage, such as magnetic, magneto-optical disks, or optical disks, or may be connected to the mass storage devices to receive and/or transmit data. Examples of information media suitable for implementing computer program instructions and data include optical media such as semiconductor memory devices (e.g., magnetic media such as hard disks, floppy disks, and magnetic tapes), compact disk read-only memory (CD-ROM), digital video disk (DVD), etc., magneto-optical media such as floptical disks, and read only memory (ROM), random access memory (RAM), flash memory, erasable programmable ROM (EPROM), electrically erasable programmable ROM (EEPROM), and other known computer-readable media. Processors and memories can be supplemented or integrated by special-purpose logic circuits.

A processor may run an operating system (OS) and one or more software applications that run on the OS. The processor device may also access, store, manipulate, process and generate data in response to software execution. For simplicity, the processor device is described in the singular, but those skilled in the art will understand that the processor device may include a plurality of processing elements and/or various types of processing elements. For example, a processor device may include a plurality of processors or a processor and a controller. Additionally, different processing structures, such as parallel processors, may be configured. Additionally, computer-readable media refers to all media that a computer can access, and may include both computer storage media and transmission media.

Although this disclosure includes detailed descriptions of various detailed implementation examples, the details should not be construed as limiting the invention or scope of the claims proposed in this disclosure, but rather illustrating features of specific exemplary embodiments.

Features individually described in exemplary embodiments in this disclosure may be implemented by a single exemplary embodiment. Conversely, various features described in this disclosure with respect to a single exemplary embodiment may be implemented by a combination or appropriate sub-combination of a plurality of exemplary embodiments. Furthermore, in the present disclosure, the features may operate by a specific combination, and the combination may initially be described as claimed, however, in some cases, one or more features may be excluded from the claimed combination, or claimed combinations may be modified in the form of sub-combinations or modifications of sub-combinations.

Similarly, even if operations are depicted in a specific order in the drawings, it should not be understood that execution of the operations in a specific order or sequence is necessary, or that performance of all operations is required to obtain a desired result. In certain cases, multitasking and parallel processing can be useful. Additionally, it should not be understood that the various device components in all exemplary embodiments are necessarily separate, and the above-described program components and devices may be packaged in a single software product or multiple software products.

The exemplary embodiments disclosed herein are illustrative only and are not intended to limit the scope of the disclosure. Those skilled in the art will recognize that various modifications may be made to the exemplary embodiments without departing from the scope of the claims and their equivalents.

Accordingly, this disclosure is intended to include all other substitutions, modifications and changes that fall within the scope of the following claims.

What is claimed is:

1. A method for encoding a multi-plane image (MPI)-based volumetric video, comprising:
- generating an MPI for each frame according to time change from a plurality of multi-viewpoint images;
- identifying a dynamic region and a static region within the MPI for each frame;
- generating a first atlas based only on the dynamic region and a second atlas based only on the static region; and
- encoding the first atlas and the second atlas to generate a bitstream, respectively,
- wherein, for generating the first atlas and the second atlas, a transform is, respectively, applied to color values that change according to viewpoint directions to derive transform coefficients.

2. The method of claim 1, wherein transforms of different policies are applied to the first atlas and the second atlas, respectively.

3. The method of claim 2, wherein the transforms include a discrete cosine transform (DCT).

4. The method of claim 1, wherein in generating the first atlas, a single first geometry atlas that does not change over time is generated for the dynamic region, and a first texture atlas is generated for each frame using the first geometry atlas.

5. The method of claim 4, wherein the first texture atlas is reconstructed into a viewpoint plane,
- wherein a transform is applied to color values that change according to viewpoint directions for each viewpoint plane unit to derive transform coefficients for the first texture atlas,
- wherein the transform coefficients for the first texture atlas are reconstructed into a spatial plane to derive a plurality of coefficient planes, and
- wherein only one or more coefficient planes selected from the plurality of coefficient planes are encoded to generate the bitstream.

6. The method of claim 1, wherein in generating the second atlas, a single second geometry atlas is generated for the static region, and a single second texture atlas that does not change over time is generated using the second geometry atlas.

7. The method of claim 6, wherein the second texture atlas is reconstructed into a viewpoint plane,
- wherein a transform is applied to color values that change according to viewpoint directions for each viewpoint plane unit to derive transform coefficients for the second texture atlas,
- wherein the transform coefficients for the second texture atlas are reconstructed into a spatial plane to derive a coefficient plane, and
- wherein the coefficient plane is encoded to generate the bitstream.

8. An apparatus for encoding a multi-plane image (MPI)-based volumetric video, the apparatus comprising:
- at least one processor; and
- at least one memory operably connected to the at least one processor and storing instructions that, when executed by the one or more processors, cause the apparatus to perform operations comprising:
- generating an MPI for each frame according to time change from a plurality of multi-viewpoint images;
- identifying a dynamic region and a static region within the MPI for each frame;
- generating a first atlas based only on the dynamic region and a second atlas based only on the static region; and
- encoding the first atlas and the second atlas to generate a bitstream, respectively,
- wherein, for generating the first atlas and the second atlas, a transform is, respectively, applied to color values that change according to viewpoint directions to derive transform coefficients.

9. The apparatus of claim 8, wherein transforms of different policies are applied to the first atlas and the second atlas, respectively.

10. The apparatus of claim 9, wherein the transforms include a discrete cosine transform (DCT).

11. The apparatus of claim 8, wherein in generating the first atlas, a single first geometry atlas that does not change over time is generated for the dynamic region, and a first texture atlas is generated for each frame using the first geometry atlas.

12. The apparatus of claim 11, wherein the first texture atlas is reconstructed into a viewpoint plane,
- wherein a transform is applied to color values that change according to viewpoint directions for each viewpoint plane unit to derive transform coefficients for the first texture atlas,
- wherein the transform coefficients for the first texture atlas are reconstructed into a spatial plane to derive a plurality of coefficient planes, and
- wherein only one or more coefficient planes selected from the plurality of coefficient planes are encoded to generate the bitstream.

13. The apparatus of claim 8, wherein in generating the second atlas, a single second geometry atlas is generated for the static region, and a single second texture atlas that does not change over time is generated using the second geometry atlas.

14. The apparatus of claim 13, wherein the second texture atlas is reconstructed into a viewpoint plane, wherein a transform is applied to color values that change according to viewpoint directions for each viewpoint plane unit to derive transform coefficients for the second texture atlas, wherein the transform coefficients for the second texture atlas are reconstructed into a spatial plane to derive a coefficient plane, and wherein the coefficient plane is encoded to generate the bitstream.

15. At least one non-transitory computer-readable medium storing at least one instruction, wherein the at least one instruction executable by at least one processor controls an apparatus for encoding a multi-plane image (MPI)-based volumetric video to:

generate an MPI for each frame according to time change from a plurality of multi-viewpoint images;

identify a dynamic region and a static region within the MPI for each frame;

generate a first atlas based only on the dynamic region and a second atlas based only on the static region; and encode the first atlas and the second atlas to generate a bitstream, respectively, wherein, for generating the first atlas and the second atlas, a transform is, respectively, applied to color values that change according to viewpoint directions to derive transform coefficients.

* * * * *